March 25, 1969  H. D. MILLER  3,435,274
PLURALITY OF CERAMIC SPACERS FOR SEPARATING PLANAR GRIDS
Filed April 29, 1966

INVENTOR,
HAROLD D. MILLER
BY Harry M. Saragovitz
Edward J. Kelly, Herbert Berl
& Julian C. Keppler ATTORNEYS

United States Patent Office 3,435,274
Patented Mar. 25, 1969

3,435,274
PLURALITY OF CERAMIC SPACERS FOR SEPARATING PLANAR GRIDS
Harold D. Miller, Owensboro, Ky., assignor, by mesne assignments, to the United States of America as represented by the Secretary of the Army
Filed Apr. 29, 1966, Ser. No. 547,078
Int. Cl. H01j 1/46
U.S. Cl. 313—348                                                2 Claims

ABSTRACT OF THE DISCLOSURE

This invention relates to a grid separator for use in electric discharge device. Essentially the device consists of a plurality of separators that are positioned between a pair of planar grid assemblies. The separators are triangular in shape and are constructed of a ceramic material.

---

This invention relates to segmented ceramic spacers for separating planar grids.

This invention is an improvement over the continuous ceramic ring which is used as a grid separator in the grid sub-assembly disclosed in FIGS. 4 and 5 of U.S. Patent No. 3,082,339 issued to R. E. Manfredi on Mar. 19, 1963. The ceramic ring disclosed in that patent has been found to consistantly fracture during operation. Ceramic particles of various sizes have been found in the tubes opened for examination after failure.

It is therefore an object of this invention to provide a grid separator having a segmented design which eliminates the occurrence in the tube of particles due to grid separator fracturing.

Another object of this invention is to provide a grid separator having reduced ceramic surface available to contamination from volatile electrically conductive materials which tend to produce electrical grid leakage.

Another object of this invention is to provide a stable relationship between control grid and screen grid by securely bonding them to ceramic segments which are tolerant of the thermal expansion differential between the grid washers and the ceramic separator.

The design of grid separation proposed by this invention utilizes four triangular ceramic wedges of appropriate thickness bonded on the flat surfaces thereof to the screen and control grids.

Figure 1:
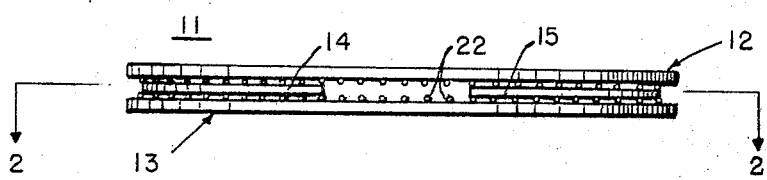
Figure 2:
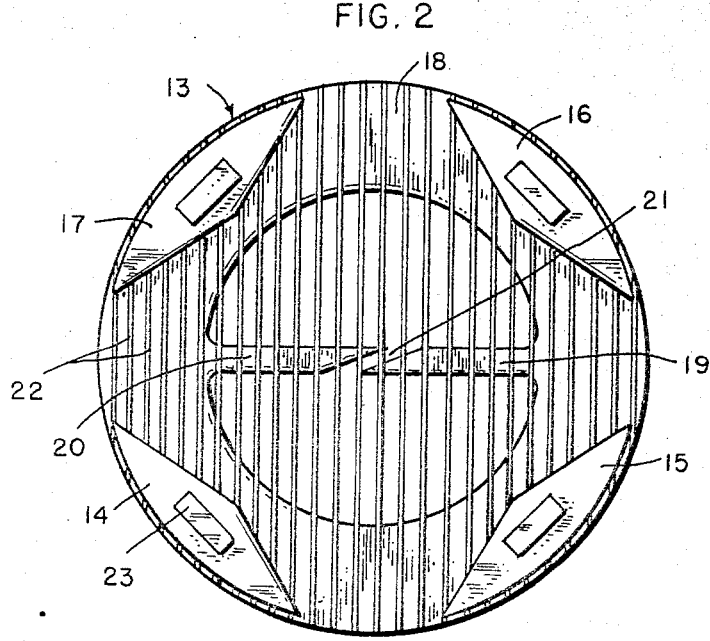

Other objects and advantages of this invention will become apparent from the following discussion of the drawings in which:

FIG. 1 is a view of the grid sub-assembly incorporating the separator segments designed in accordance with this invention, and FIG. 2 is a view taken along the lines 2—2 in FIG. 1 and looking in the direction of the arrows.

Referring now to FIG. 1 there is shown a grid sub-assembly 11 which comprises a screen grid 12 and a control grid 13 separated by grid spacers 14 and 15.

In FIG. 2 the remaining two grid spacers 16 and 17 can be seen. The grids 12 and 13 are similarly constructed; therefore, only the control grid 13, which is shown in FIG. 2, will be described. The grid 13 comprises a thin washer 18 which includes two straight, diametrically opposed cross bars 19 and 20 having a diagonal slot 21 extending therebetween. A plurality of closely spaced, parallel coplanar grid wires 22 are brazed across the circular portion of the washer 18 and the cross bars 19 and 20. The cross bars support the grid wires at their mid-points to prevent excessive sagging and to increase the resonant mechanical frequency of vibration. The slot 21 prevents buckling of the grid washer, and because of the diagonal extension thereof, does not detract from the effectiveness of the cross bars in preventing sagging of the grid wires.

The screen and control grids are spaced a predetermined distance by the four equally spaced ceramic grid spacers 14, 15, 16 and 17. Each of the spacers is coated on both sides with a material such as titanium hydride which bonds the grids to the spacers upon firing. Any conventional ceramic metallizing technique may be used for this purpose.

From FIG. 2 it can be seen that the outer edge of the spacers has a radius slightly less than that of the washer 18, and this outer edge is spaced slightly from the outer circumference of the washer. The other two sides of the triangularly shaped spacer meet at a point which is substantially spaced from the inner circumference of the washer 18. This triangular shape reduces the ceramic surface available to contamination from cathode evaporants which would tend to deposit on the ceramic spacers and electrically short circuit the grids. In the preferred embodiment of this invention, the separator elements are centered on lines which are located 45 degrees from the longitudinal axis of the cross bars 19 and 20.

The above described grid spacing technique possesses the advantages of the continuous ceramic spacer, but it avoids the detrimental effects thereof. The use of triangular spacers permits the grids to be closely spaced by a predetermined amount, and at the same time this design eliminates the occurrence in the tube of particles resulting from a fractured grid separator.

What is claimed is:
1. A grid electrode assembly comprising first and second planar grids, each including a metal washer and a plurality of spaced grid wires extending across said washer and bonded to the rim thereof, and a plurality of spaced planar ceramic separator elements between the metal washers of said first and second grids and being bonded thereto, said separator elements being generally triangular in shape with one edge thereof having a radius slightly less than the outside radius of the metal washers and the other two sides meeting at a point which is substantially displaced from the inner diameter of said washers.

2. A grid electrode assembly as set forth in claim 1 wherein said separator elements are equally spaced around the circumference of said washers.

References Cited

UNITED STATES PATENTS

| Re 15,278 | 1/1922 | Langmuir | 313—257 X |
|---|---|---|---|
| 2,455,851 | 12/1948 | Beggs | 313—257 X |
| 2,916,649 | 12/1959 | Levin | 313—257 X |
| 3,082,339 | 3/1963 | Manfredi | 313—250 X |
| 3,154,711 | 10/1964 | Beggs | 313—348 X |
| 3,359,447 | 12/1967 | Tsuyama et al. | 313—268 X |

JOHN W. HUCKERT, *Primary Examiner.*

A. J. JAMES, *Assistant Examiner.*

U.S. Cl. X.R.
313—43, 250, 257